United States Patent
Breeden

(10) Patent No.: US 9,961,876 B2
(45) Date of Patent: May 8, 2018

(54) VEHICLE-BASED FEED DISTRIBUTION SYSTEM

(71) Applicant: Richard E Breeden, Rising Fawn, GA (US)

(72) Inventor: Richard E Breeden, Rising Fawn, GA (US)

( * ) Notice: Subject to any disclaimer, the term of this patent is extended or adjusted under 35 U.S.C. 154(b) by 0 days. days.

(21) Appl. No.: 15/241,861

(22) Filed: Aug. 19, 2016

(65) Prior Publication Data
US 2018/0049402 A1 Feb. 22, 2018

(51) Int. Cl.
| | | |
|---|---|---|
| B67B 7/00 | (2006.01) | |
| A01K 5/00 | (2006.01) | |
| B65G 11/02 | (2006.01) | |
| B65G 33/14 | (2006.01) | |
| B65G 33/32 | (2006.01) | |
| B65G 11/20 | (2006.01) | |

(52) U.S. Cl.
CPC .............. *A01K 5/00* (2013.01); *B65G 11/026* (2013.01); *B65G 11/206* (2013.01); *B65G 33/14* (2013.01); *B65G 33/32* (2013.01); *B65G 2201/042* (2013.01)

(58) Field of Classification Search
CPC .... B65G 11/206; B65G 11/026; B65G 33/12; B65G 33/14; B65G 33/18; B65G 33/22; B65G 33/32; A01K 5/00; A01C 15/00–15/18
See application file for complete search history.

(56) References Cited

U.S. PATENT DOCUMENTS

| | | | | | |
|---|---|---|---|---|---|
| 608,585 | A | * | 8/1898 | Dentler | B65G 11/126 193/16 |
| 1,651,390 | A | * | 12/1927 | Hersman | A01C 1/08 118/418 |
| 2,405,727 | A | * | 8/1946 | Aaberg | A01D 90/10 414/526 |
| 2,488,407 | A | * | 11/1949 | Hoffstetter | B60P 1/36 414/523 |
| 2,490,241 | A | * | 12/1949 | Smith | B60P 1/40 119/57.92 |
| 2,555,908 | A | * | 6/1951 | Von Edeskuty | A23J 1/12 127/25 |
| 2,585,169 | A | * | 2/1952 | Potter | B60P 1/40 366/182.3 |
| 2,751,097 | A | * | 6/1956 | Miller | B60P 1/40 414/523 |
| 2,783,907 | A | * | 3/1957 | Hudgins | A01D 41/1217 414/505 |

(Continued)

*Primary Examiner* — Nicholas J Weiss
*Assistant Examiner* — Randall Gruby
(74) *Attorney, Agent, or Firm* — The Keith Miller Law Group; Keith Miller

(57) ABSTRACT

The invention described herein is a vehicle-based feed distribution system comprising: a hopper assembly where a metal ball is located in a hopper outlet located at a bottom portion of a hopper, where an auger inside a horizontal dispensing tube is driven by an auger drive means that directs a feed mix from a hopper longitudinally down the horizontal dispensing tube extending out from the hopper outlet, and where a feed outlet at a distal end of the horizontal dispensing tube distributes the feed mix; where the hopper assembly is coupled to a tow vehicle, and where the tow vehicle controls the auger drive means to meter distribution of the feed mix.

9 Claims, 5 Drawing Sheets

(56) References Cited

U.S. PATENT DOCUMENTS

| | | | | |
|---|---|---|---|---|
| 2,800,238 | A * | 7/1957 | Oliver | B01F 13/0035 198/550.4 |
| 2,839,208 | A * | 6/1958 | Hansen | B60P 1/40 414/505 |
| 2,877,914 | A * | 3/1959 | Herr | B01F 13/0035 198/570 |
| 2,896,923 | A * | 7/1959 | Luscombe | B01F 13/0035 366/186 |
| 3,014,575 | A * | 12/1961 | Klein | B65G 33/32 198/659 |
| 3,021,025 | A * | 2/1962 | Sudenga | B65G 33/00 198/320 |
| 3,090,507 | A * | 5/1963 | Gutekunst | B65G 65/46 198/550.2 |
| 3,100,052 | A * | 8/1963 | Brembeck | B65G 65/46 198/550.2 |
| 3,144,928 | A * | 8/1964 | Roloson | B65G 67/00 198/535 |
| 3,175,676 | A * | 3/1965 | Vander Schaaf | B65G 67/24 198/550.1 |
| 3,265,253 | A * | 8/1966 | Niewold | B60P 1/40 198/300 |
| 3,273,734 | A * | 9/1966 | Schuler | A01D 90/105 366/156.2 |
| 3,283,925 | A * | 11/1966 | Gutekunst | B65G 65/46 198/532 |
| 3,342,355 | A * | 9/1967 | Lasiter | B65G 65/46 198/540 |
| 3,391,778 | A * | 7/1968 | Lasiter | B60P 1/40 198/530 |
| 3,410,389 | A * | 11/1968 | Ashton | A01D 41/1217 198/582 |
| 3,439,819 | A * | 4/1969 | Quanbeck | B60P 1/60 111/200 |
| 3,561,681 | A * | 2/1971 | Tyler | A01C 15/003 239/663 |
| 3,580,384 | A * | 5/1971 | Pingree | B65G 65/46 198/550.1 |
| 3,638,816 | A * | 2/1972 | Mann | B65G 41/002 414/504 |
| 4,092,014 | A * | 5/1978 | Hughes | A01K 5/004 241/101.8 |
| 4,218,169 | A * | 8/1980 | Arends | B60P 1/40 414/523 |
| 4,411,581 | A * | 10/1983 | Niewold | B60P 1/40 222/163 |
| 4,503,803 | A * | 3/1985 | Barnes | A01C 1/08 111/173 |
| 4,611,921 | A * | 9/1986 | Patel | B01F 15/0298 198/533 |
| 4,895,106 | A * | 1/1990 | Barnes | A01C 1/08 118/19 |
| 4,989,716 | A * | 2/1991 | Stuckey | B65G 33/32 198/311 |
| 5,277,825 | A * | 1/1994 | Tobler | B01F 13/0035 210/739 |
| 5,615,990 | A * | 4/1997 | Grieshop | B60P 1/42 198/550.1 |
| 5,709,466 | A * | 1/1998 | Weszely | B28C 7/04 366/30 |
| 5,785,481 | A * | 7/1998 | Ockels | B60P 1/42 222/1 |
| 6,209,880 | B1 * | 4/2001 | Turnwald | B60P 1/42 198/671 |
| 6,497,546 | B2 * | 12/2002 | Wood | B60P 1/42 198/536 |
| 8,047,757 | B1 * | 11/2011 | Wood | B60P 1/42 198/668 |
| 2014/0061249 | A1 * | 3/2014 | Hilvers | A01C 15/007 222/236 |

* cited by examiner

VEHICLE-BASED FEED DISTRIBUTION SYSTEM

DETAILED DESCRIPTION OF THE INVENTION

The following description of the preferred embodiments of the invention is intended to enable someone skilled in the prior art to make and use this invention, but is not intended to limit the invention to these preferred embodiments.

Figure 1:
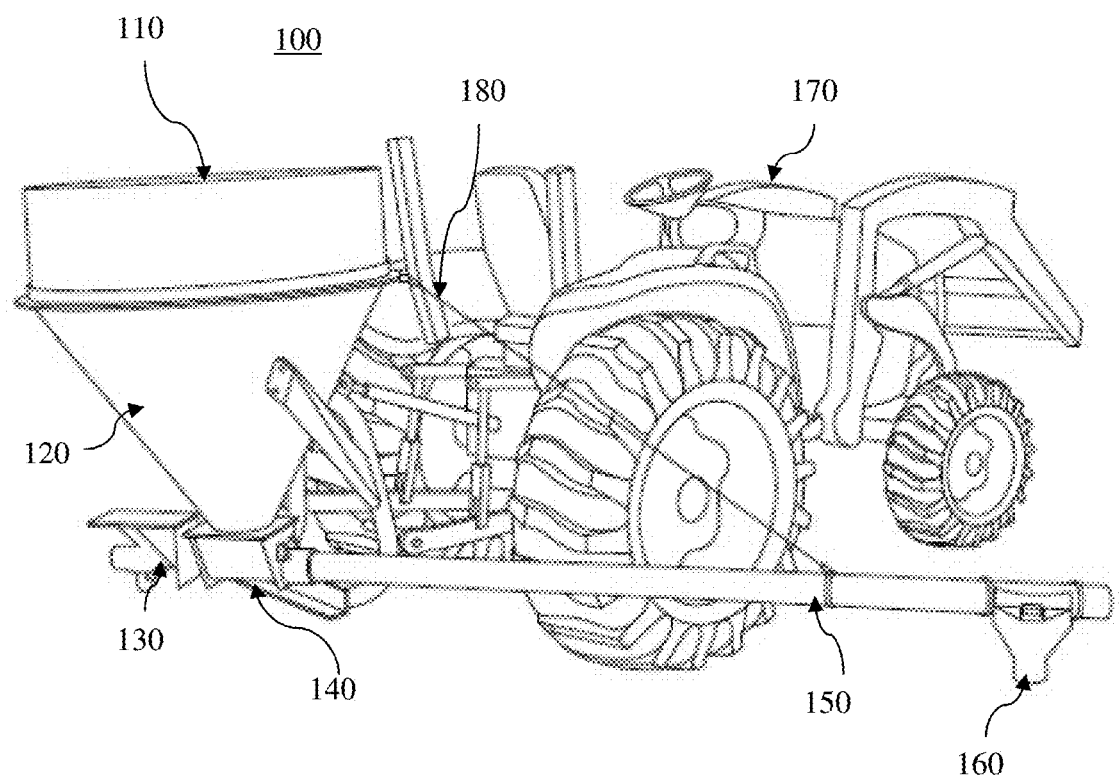
FIG. 1 is a perspective view for a VEHICLE-BASED FEED DISTRIBUTION SYSTEM according to a preferred embodiment of the present invention.

Now referring to FIG. 1, the invention described herein is a vehicle-based feed distribution system 100 comprising a hopper assembly 110, where a metal ball is located on top of an auger between at least two parallel angled guide panels in a hopper outlet 140 located at a bottom portion of the hopper 120 where the auger inside the hopper outlet 140 is driven by an auger drive means 130 to direct a feed mix from the hopper longitudinally down a horizontal dispensing tube extending outwardly from the hopper outlet, and where a feed outlet at a distal end of the horizontal dispensing tube distributes the feed mix; where the hopper assembly 110 is coupled to a tow vehicle 170, and where the tow vehicle controls the auger drive means to meter the distribution of the feed mix.

As further shown in FIG. 1, the tow vehicle 170 is preferably a vehicle capable of pulling the hopper assembly 110 along behind. An example is a farm tractor where the hopper assembly is removably attached directly onto a rear of the tow vehicle 170. Alternately preferably, the hopper assembly 110 is removably attached onto a trailer and the trailer is removably attached to the tow vehicle through a common ball and hitch connection. Alternately preferably, the tow vehicle is a pick-up truck, or other type of vehicle capable of pulling the hopper assembly behind it.

Figure 2:
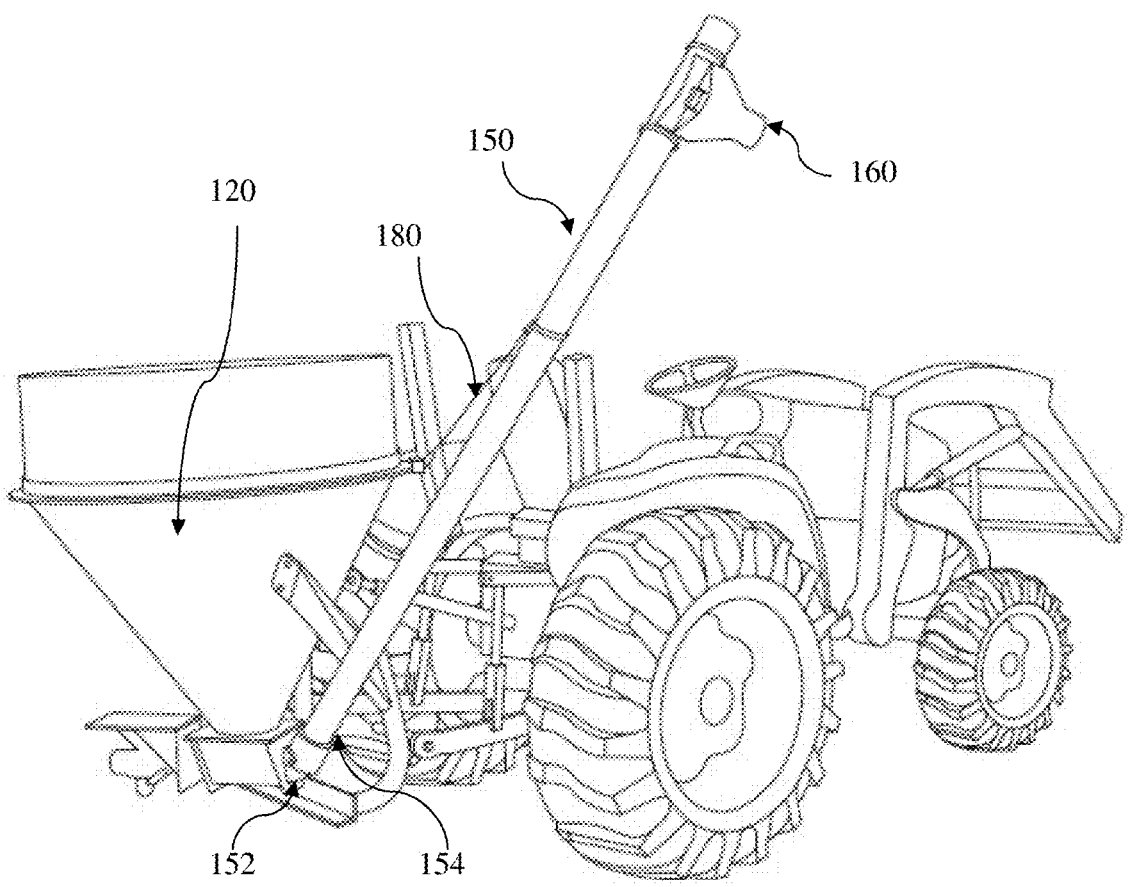
FIG. 2 is a perspective view for a VEHICLE-BASED FEED DISTRIBUTION SYSTEM according to a preferred embodiment of the present invention.

As shown in FIG. 2, the horizontal dispensing tube proximal end 154 is preferably connected to the hopper outlet 140 with a flexible hose connection 152 to allow the horizontal dispensing tube 150 to be folded generally vertically upward against the hopper 120 while not in use. Additionally, the flexible hose connection of the horizontal dispensing tube proximal end to the bottom of the hopper will preferably allow the horizontal dispensing tube to traverse forward and backward horizontal movement through a range of motion of about sixty (60) degrees. The forward and backward horizontal movement would preferably be controlled by a driver of the tow vehicle to position the feed outlet 160 at the distal end of the horizontal dispensing tube 150 as necessary while driving.

Figure 3:
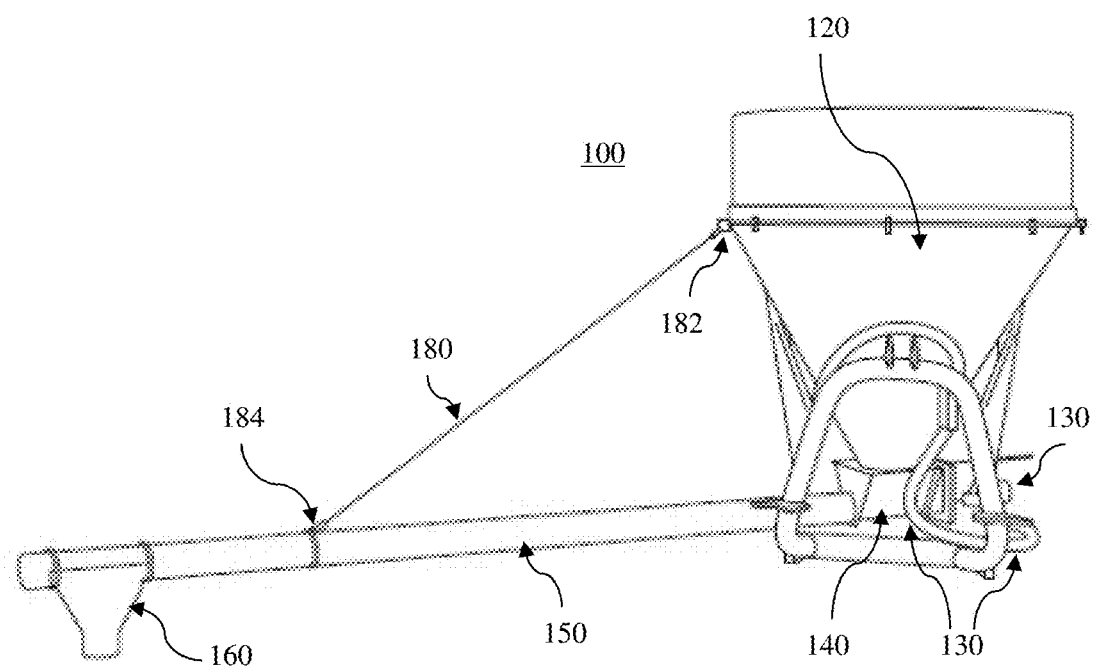
FIG. 3 is a perspective view of a hopper assembly for a VEHICLE-BASED FEED DISTRIBUTION SYSTEM according to a preferred embodiment of the present invention.

As shown in FIG. 3, the auger drive means 130 is located on the hopper assembly 110 next to the hopper outlet 140 at the bottom of the hopper 120. The auger drive means 130 is preferably coupled directly to the auger inside the bottom portion of the hopper 120. When the hopper assembly 110 is removably attached onto a tow vehicle, an auger drive means controller is preferably coupled to the tow vehicle such that a driver of the tow vehicle will preferably control the speed of the auger by controlling the speed of the tow vehicle.

A tow vehicle driver preferably controls the auger drive means which, in turn, controls the speed of the auger. The speed of the auger will, in turn, preferably control the amount of feed mix that is directed from the hopper 120 down through the horizontal dispensing tube 150 and out the feed outlet 160. By controlling the auger drive means 130, the tow vehicle driver controls the amount of feed mix being output. The auger is preferably connected to the auger drive means and is preferably operated by a remote selector hydraulic valve or a toggle/push button switch for the power take-off means or electric motor.

As further shown in FIG. 3, the horizontal dispensing tube 150 preferably extends out away from the hopper 120 at an approximately ninety-degree angle relative to the direction of travel. The horizontal dispensing tube 150 preferably extends out beyond the wheels of the tow vehicle such that the feed outlet 160 can be seen by the driver of the tow vehicle for positioning.

As further shown in FIG. 3, the horizontal dispensing tube is stabilized with a stabilization means, which is preferably a cable 180 extending from the top portion of the hopper at a downward angle to an outward portion of the horizontal dispensing tube 150. The cable 180 is preferably removably attached to a first swivel end 182 located on the upper portion of the hopper, and a second swivel end 184 located on the horizontal dispensing tube 150. The first and second swivel ends are preferably configured to accept a cable attachment fastener, such as a carabiner. Alternately preferably, the stabilization means 180 is a tubular bar structured and arranged to. The stabilization means 180 will preferably prevent the horizontal dispensing tube from unwanted motion while the tow vehicle is driving over possibly uneven ground. Other means of stabilizing the horizontal dispensing tube not enumerated herein may be used without limitation.

As further shown in FIG. 3, the horizontal dispensing tube 150 proximal end is attached to the bottom apex of the hopper at the hopper outlet 140. The bottom apex of the hopper contains an opening for the feed mix to flow through and into the horizontal dispensing tube 150. The auger is situated horizontally in the horizontal dispensing tube such that the auger pulls the feed mix down through the hopper outlet 140 and into the horizontal dispensing tube 150 to the feed outlet 160 at the distal end of the horizontal dispensing tube.

As further shown in FIG. 3, the feed outlet 160 is preferably a flattened conical shape where the apex is aimed downward toward the ground. An upper large opening of the feed outlet 160 is removably attached to the horizontal dispensing tube 150 such that the upper large opening completely covers a metered opening in the distal end of the horizontal dispensing tube 150. Various means of removably attaching the feed outlet 160 include at least one common metal strapping clamp, screws, and any other means not specifically called out here.

As further shown in FIG. 3, the feed outlet 160 is preferably located on the distal end of the horizontal dispensing tube. The feed outlet 160 is preferably structured and arranged on the underside of the horizontal dispensing tube 150 so that the feed mix is dispensed downward toward feed trays on the ground. The driver of the tow vehicle can drive up and down a line of feed trays and dispense the feed mix into the feed trays. The feed outlet 160 condenses the feed mix into a solid stream so that an even amount of feed mix is distributed into each of the feed trays.

As further shown in FIG. 1, the hopper assembly 110 is preferably mounted onto the rear of a tow vehicle 170. The tow vehicle 170 can be any vehicle capable of having the hopper assembly 110 attached to. The tow vehicle 170 can be a common farm tractor, an all-terrain vehicle (ATV), or even a non-commercial vehicle such as a pickup truck. The auger drive means is connected to the tow vehicle via the auger drive means controller when mounting the hopper assembly 110 onto the tow vehicle.

In an alternate embodiment, the hopper assembly can preferably be mounted onto a trailer for towing behind the tow vehicle. The trailer variation allows the hopper assembly to be towed behind a tow vehicle instead of being directly mounted to the tow vehicle. The tow vehicle can be an all-terrain vehicle (ATV), a typical farm tractor, a skid steer loader, or any other type vehicle not enumerated herein.

Figure 4:
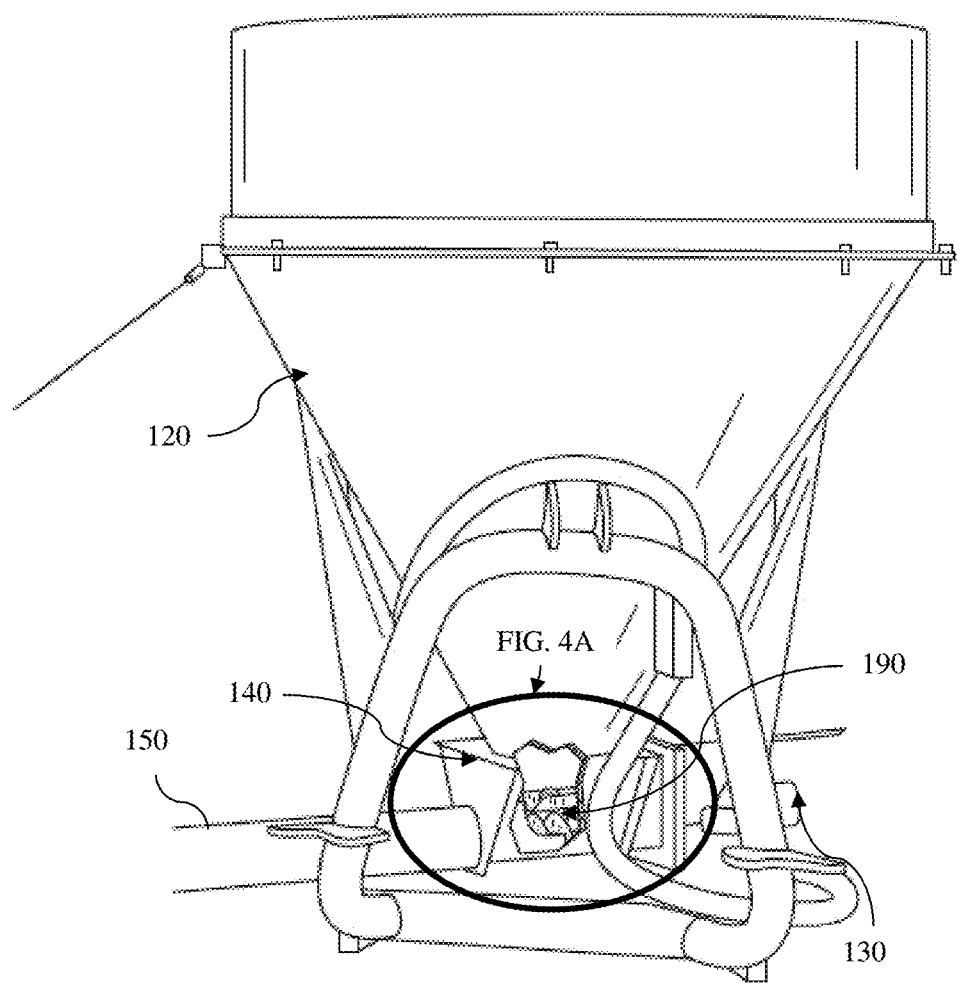
FIG. 4 is a cut-away view of the hopper assembly showing an auger for a VEHICLE-BASED FEED DISTRIBUTION SYSTEM according to a preferred embodiment of the present invention.

As shown in FIG. 4, the auger 190 is preferably located inside the horizontal dispensing tube 150 situated so the feed mix is pulled downward at the proximal end of the auger. The auger is preferably horizontally positioned directly under the hopper outlet and extends partially down the horizontal dispensing tube. The auger is preferably positioned such that when the auger is operating, the feed mix in the hopper is pulled downward into the hopper outlet. The auger is preferably driven by an auger drive means comprising any one of A) a hydraulic means, B) a power take-off means, C) a combustion engine means, or D) an electric motor means directly connected to the tow vehicle.

Figure 4A:
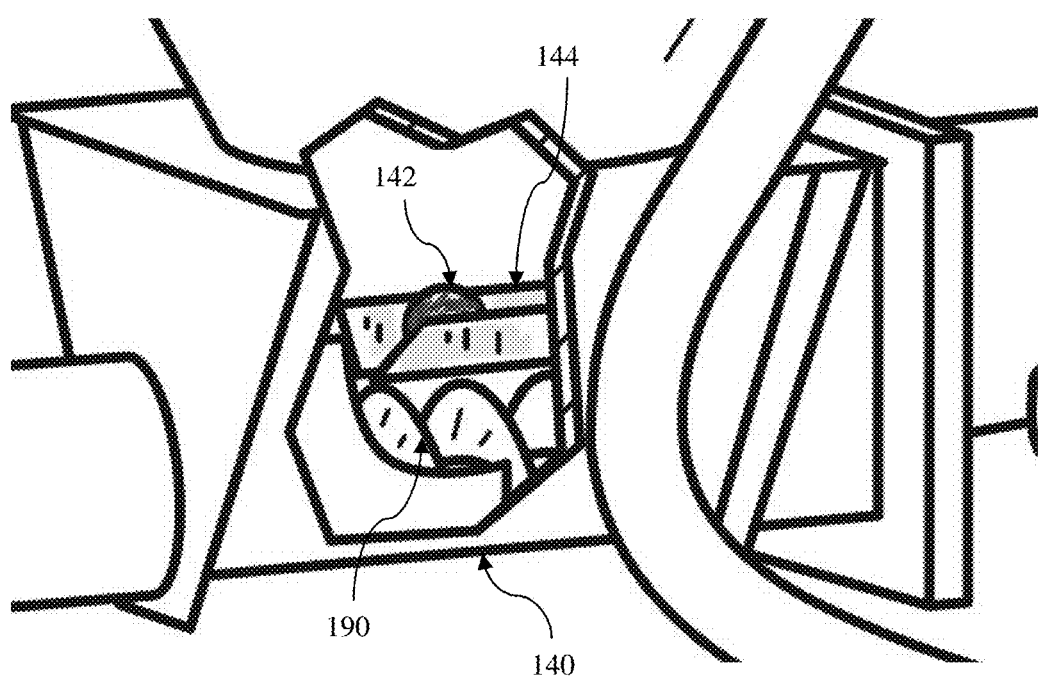
FIG. 4A is a close-up cut-away view of the hopper outlet showing the orientation of the auger for a VEHICLE-BASED FEED DISTRIBUTION SYSTEM according to a preferred embodiment of the present invention.

As further shown in FIG. 4A, a metal ball 142 is preferably positioned within the hopper outlet 140 on top of the auger 190 between at least two parallel angled guide panels 144. The metal ball 142 is preferably positioned directly above and is in light contact with the auger 190. When the auger 190 is operating, the metal ball 142 will turn and vibrate from the augers operation, allowing the feed mix to flow more freely through the hopper outlet 140. The vibration of the metal ball 142 will also preferably provide greater feed mix agitation which will break up any clumping of the feed mix.

The hopper assembly includes an auger drive means using any of a variety of power systems, including hydraulics, power take-off, combustion engine, or an electric motor means. An auger drive means using hydraulics would include a hydraulic motor located on the hopper assembly under the hopper outlet and next to the horizontal dispensing tube. The engine of the tow vehicle would provide energy to activate the hydraulic motor which, in turn, would turn the auger to drive the feed mix down toward the distal end of the horizontal dispensing tube toward the feed outlet. A power take-off means is defined as a system using the tow vehicle engine to convert mechanical energy of the engine and transfer that mechanical energy to another device, in this case the auger drive means. A combustion engine means would be a combustion engine under the hopper outlet next to the horizontal dispensing tube that is controlled by the tow vehicle's engine. An electric motor means would have an electric motor under the hopper outlet next to the horizontal dispensing tube and is controlled by the tow vehicle's engine.

I claim:

1. A vehicle-based feed distribution system comprising: a hopper assembly wherein a metal ball is located on top of an auger between at least two angled guide panels, wherein each of the ball and the angled panels are located in an interior of a hopper outlet located at a bottom portion of a hopper, wherein said auger inside said hopper outlet is driven by an auger drive means to direct a feed mix from said hopper longitudinally down a horizontal dispensing tube extending outwardly from said hopper outlet, wherein a feed outlet is removably attached to a distal end of said horizontal dispensing tube distributes said feed mix downward; wherein a tow vehicle is configured to pull said hopper assembly, wherein an engine of said tow vehicle directly controls said auger drive means to meter distribution of said feed mix and wherein said angled guide panels have longitudinal axes, wherein the longitudinal axes are configured to be parallel to each other and parallel to said auger.

2. The vehicle-based feed distribution system of claim 1 wherein said auger drive means can be any of A) a hydraulic means, B) a power take-off means, C) a combustion engine means, or D) an electric motor means.

3. The vehicle-based feed distribution system of claim 1 further comprising a flexible hose coupling wherein said flexible hose coupling connects said bottom portion of said hopper to a proximal end of said horizontal dispensing tube.

4. The vehicle-based feed distributing system of claim 3 wherein said flexible hose coupling allows said horizontal dispensing tube to fold vertically upward against said hopper when not in use.

5. The vehicle-based feed distribution system of claim 3 wherein said flexible hose coupling allows said horizontal dispensing tube to traverse in a 60 degree arc relative to the ground.

6. The vehicle-based feed distributing system of claim 1 further comprising a stabilizing means wherein said horizontal dispensing tube is prevented from moving vertically while said tow vehicle is in motion.

7. The vehicle-based feed distribution system of claim 6 wherein said stabilizing means is a tubular bar with a first swivel end connected to said hopper and a second swivel end is connected to said horizontal dispensing tube.

8. The vehicle-based feed distribution system of claim 6 wherein said stabilizing means is a cable with a first swivel end connected to said hopper and a second swivel end is connected to said horizontal dispensing tube.

9. The vehicle-based feed distribution system of claim 8 wherein said cable is steel.

* * * * *